(12) United States Patent
Ozkan et al.

(10) Patent No.: US 9,136,542 B2
(45) Date of Patent: Sep. 15, 2015

(54) CATALYSTS FOR USE IN ELECTROCHEMICAL APPLICATIONS AND ELECTRODES AND DEVICES USING SAME

(75) Inventors: Umit S. Ozkan, Worthington, OH (US); Dieter von Deak, Edison, NJ (US); Elizabeth Biddinger, Smyrna, GA (US)

(73) Assignee: The Ohio State University, Columbus, OH (US)

( * ) Notice: Subject to any disclaimer, the term of this patent is extended or adjusted under 35 U.S.C. 154(b) by 41 days.

(21) Appl. No.: 13/474,341

(22) Filed: May 17, 2012

(65) Prior Publication Data

US 2012/0295137 A1 Nov. 22, 2012

Related U.S. Application Data

(60) Provisional application No. 61/487,431, filed on May 18, 2011.

(51) Int. Cl.
| | |
|---|---|
| *B01J 31/26* | (2006.01) |
| *H01M 8/10* | (2006.01) |
| *C07F 9/50* | (2006.01) |
| *H01M 2/00* | (2006.01) |
| *H01M 4/90* | (2006.01) |

(Continued)

(52) U.S. Cl.
CPC ........ *H01M 4/96* (2013.01); *B82Y 30/00* (2013.01); *H01M 2008/1095* (2013.01); *Y02E 60/50* (2013.01)

(58) Field of Classification Search
CPC . H01M 4/96; H01M 2008/1095; B82Y 30/00
USPC ............... 429/400, 7, 523–534; 502/1
See application file for complete search history.

(56) References Cited

U.S. PATENT DOCUMENTS

| | | | | |
|---|---|---|---|---|
| 4,232,097 | A | * | 11/1980 | Shanks et al. ........... 429/505 |
| 5,523,177 | A | * | 6/1996 | Kosek et al. ........... 429/480 |

(Continued)

OTHER PUBLICATIONS

Gong, K. Du, F. Xia, Z., Durstock, M., Dai, L.; Nitrogen-Doped Carbon Nanotube Arrays with High Electrocatalytic Activity for Oxygen Reduction, Feb. 6 2009, Science, vol. 323, pp. 760-764.*
Zhang, Y., Mori, T., Ye, J., Antonietti, M.; Phosphorus-Doped Carbon Nitride Solid: Enhanced Electrical Conductivity and Photocurrent Generation, Apr. 16, 2010, J. Am. Chem. Soc. JACS Communications, vol. 132, pp. 6294-6295.*
"The effect of phosphorus in nitrogen-containing carbon nanostructures on oxygen reduction in PEM fuel cell" by D. von Diek, E. Biddinger, K. Luthman, and U. Ozkan; Carbon. vol. 48 Issue 12 (Oct. 2010) p. 3637-3639 (and available online May 19, 2010).*
"Electronic Transport and Mechanical Properties of Phosphorus- and Phosphorus—Nitrogen-Doped Carbon Nanotubes", by Cruz-Silva et al., ACS Nano vol. 3(7) 1913-1921 (2009).*

(Continued)

*Primary Examiner* — Milton I Cano
*Assistant Examiner* — Michael Dignan
(74) *Attorney, Agent, or Firm* — Wood, Herron & Evans, LLP (57) ABSTRACT

An electrode for reduction of an oxidant including a phosphorus-doped carbon-containing catalyst represented by the chemical formula $CN_xP_y$, where x is from 0 to about 10 wt. % and y is from about 1 ppm to about 10 wt. %. A device for producing electricity by facilitating an electrochemical reaction between a fuel and an oxidant. The device including a first electrode for oxidizing the fuel to produce protons and electrons. The device further includes a second electrode in electrical communication with the first electrode when electrically connected to the external circuit. The second electrode includes a phosphorus-doped carbon-containing catalyst for reducing the oxidant and is represented by the chemical formula $CN_xP_y$, where x is from 0 to about 10 wt. % and y is from about 1 ppm to about 10 wt. %. The device further includes an electrolyte, such as, a membrane, separating the first electrode from the second electrode.

12 Claims, 4 Drawing Sheets

(51) Int. Cl.
*B82Y 30/00* (2011.01)
*H01M 4/96* (2006.01)

(56) References Cited

U.S. PATENT DOCUMENTS

| | | | |
|---|---|---|---|
| 5,879,828 A | | 3/1999 | Debe et al. |
| 6,784,779 B2* | | 8/2004 | Shin et al. ............... 336/200 |
| 7,105,246 B2 | | 9/2006 | Suzuki et al. |
| 7,108,939 B2 | | 9/2006 | Suzuki et al. |
| 7,125,822 B2 | | 10/2006 | Nakano et al. |
| 7,160,837 B2 | | 1/2007 | Hasegawa |
| 7,608,358 B2 | | 10/2009 | Ye |
| 7,629,285 B2 | | 12/2009 | Popov et al. |
| 7,842,734 B2 | | 11/2010 | Geormezi et al. |
| 2003/0108480 A1* | | 6/2003 | Baker et al. ............ 423/447.3 |
| 2004/0142816 A1* | | 7/2004 | Baker et al. ............... 502/325 |
| 2007/0212538 A1* | | 9/2007 | Niu .......................... 428/367 |
| 2007/0248875 A1* | | 10/2007 | O'Brien et al. ............. 429/44 |
| 2007/0275160 A1* | | 11/2007 | Maldonado et al. ....... 427/122 |
| 2010/0075199 A1* | | 3/2010 | Darling ...................... 429/34 |
| 2010/0183950 A1* | | 7/2010 | Dai ........................... 429/513 |
| 2010/0323207 A1 | | 12/2010 | Pinault et al. |
| 2011/0005938 A1 | | 1/2011 | Wolf et al. |
| 2011/0048943 A1 | | 3/2011 | Nemes |

OTHER PUBLICATIONS

"Doped Carbon Nanotubes: Synthesis, Characterization, and Applications", Terrones et al., Topics in Applied Physics 111 (2008) 531-566.*

"A computational exploration of the oxygen reduction reaction over a carbon catalyst containing a phosphinate functional group", Bao et al., Chem. Commun. 46 (2010) 8621-8623 (Bao).*

"Nitrogen-Doped Carbon Nanotube Arrays with High Electrocatalytic Activity for Oxygen Reduction", K. Gong,F. Du, Z. Xia, M. Durstock, L. Dai, Science V23, 760 (Feb. 6, 2009).*

"Heterodoped Nanotubes: Theory, Synthesis, and Characterization of Phosphorus—Nitrogen Doped Multiwalled Carbon Nanotubes" by Cruz-Silva et al., ACS Nano vol. 2(3) (2008) 441-448.*

"Development of non-precious metal oxygen-reduction catalysts for PEM fuel cells based on N-doped orderd porous carbon", Lui, G., Li, X., Ganesan, P., Popov, B., Applied Catalysis B: Environ. 93 (2009) 156-165.*

"Nitrogen-doped carbon nanostructures and their composites as catalytic materials for proton exchange membrane fuel cells", Shao, Y., Sui, J., Yin, G., Gao, Y., Applied Catalysis B: Environ. 79 (2008) 89-99.*

"Electrocatalytic activity of nitrogen doped carbon nanotubes with different morphologies for oxygen reduction reaction", Chen, Z., Higgins,D., Chen, Z., Electrochimica Acta 55 (2010) 4799-4804.*

"Nitrogen doped carbon nanotubes and their impact on the oxygen reduction reaction in fuel cells", Chen, Z., Higgins, D., Chen, Z., Carbon 48 (2010) 3057-3065.*

"Structure, composition, and chemical reactivity of carbon nanotubes by selective nitrogen doping", Maldonado, S., Morin, S., Stevenson, S., Carbon 44 (2006) 1429-1437.*

"The role of nanostructure in Nitrogen-containing carbon catalysts for the oxygen reduction reaction", Matter et al., Journal of Catalysis 239 (2006) 83-96.*

Strelko et al. "On the mechanism of possible influence of heteroatoms of nitrogen, boron, and phosphorus in a carbon matrix on the catalytic activity of carbons in electron transfer reactions." Carbon 38 (2000) 1499-1524.*

Cruz-Silva et al. "Electronic Transport and Mechanical Properties of Phosphorus- and Phosphorus—Nitrogen-Doped Carbon Nanotubes." ACS Nano 3 (2009) 1913-1921.*

Cruz-Silva, Eduardo, et al., "Heterodoped Nanotubes: Theory, Synthesis, and Characterization of Phosphorus—Nitrogen Doped Multiwalled Carbon Nanotubes," ACS Nano, 2008, 2 (3), pp. 441-448.

Matter, Paul H., et al., "Oxygen reduction reaction activity and surface properties of nanostructured nitrogen-containing carbon," Journal of Molecular Catalysis A: Chemical 264 (2007), pp. 73-81.

Matter, Paul H., et al., "Characterization of the Iron Phase in CNx-Based Oxygen Reduction Reaction Catalysts," J. Phys. Chem. C, vol. 111, No. 3, 2007, pp. 1444-1450.

Matter, Paul H., et al., "Preparation of nanostructured nitrogen-containing carbon catalysts for the oxygen reduction reaction from SiO2- and MgO-supported metal particles," Journal of Catalysis 243 (2006), pp. 395-403.

Matter, Paul H., et al., "Non-metal catalysts for dioxygen reduction in an acidic electrolyte," Catalysis Letters, vol. 109, Nos. 3-4, Jul. 2006, pp. 115-123.

Biddinger, Elizabeth J., et al., "Methanol Tolerance of CNx Oxygen Reduction Catalysts," Top Catal, 2007, 46:339-348.

Matter, Paul H., et al., "Oxygen Reduction Reaction Catalysts Prepared from Acetonitrile Pyrolysis over Alumina-Supported Metal Particles," J. Phys. Chem. B, vol. 110, No. 37, 2006, pp. 18374-18384.

Von Diek, Dieter, et al., "The effect of phosphorus in nitrogen-containing carbon nanostructures on oxygen reduction in PEM fuel cells," Carbon vol. 48, Issue 12, Oct. 2010, p. 3637.

Von Diek, Dieter, et al., "Use of carbon monoxide and cyanide to probe the active sites on nitrogen-doped carbon catalysts for oxygen reduction," Applied Catalysis B: Environmental 113-114, 2012, pp. 126-133.

Von Deak, Dieter, et al., "Investigation of sulfur poisoning of CNx oxygen reduction catalysts for PEM fuel cells," Journal of Catalysis 285, 2012, pp. 145-151.

Von Deak, Dieter, et al., "Carbon corrosion characteristics of CNx nanostructures in acidic media and implications for ORR performance," J. Appl Electrochem, vol. 41, No. 7, 2011, pp. 757-763.

Biddinger, Elizabeth J., et al., "Examination of Catalyst Loading Effects on the Selectivity of CNx and Pt/VC ORR Catalysts Using RRDE," Journal of the Electrochemical Society, 158 (4), 2011, pp. B402-B409.

Biddinger, Elizabeth J., et al., "RRDE Catalyst Ink Aging Effects on Selectivity to Water Formation in ORR," Electromechanical and Solid-State Letters, 13 (8), 2010, pp. B98-B100.

Biddinger, Elizabeth J., et al., "Role of Graphitic Edge Plane Exposure in Carbon Nanostructures for Oxygen Reduction Reaction," J. Phys. Chem. C, vol. 114, No. 36, 2010, pp. 15306-15314.

Baker, Ryan, et al., "Proton Exchange Membrane or Polymer Electrolyte Membrane (PEM) Fuel Cells," Electrochemistry Encyclopedia, PEM fuel cells, Apr. 2011, http://electrochem.cwru.edu/encyl/art-f04-fuel-cells-pem.htm.

Matter, Paul H., et al., "The role of nanostructure in nitrogen-containing carbon catalysts for the oxygen reduction reaction," Journal of Catalysis 239, 2006, pp. 83-96.

Maldonado, S., et al., "Direct Preparation of Carbon Nanofiber Electrodes via Pyrolysis of Iron (II) Phthalocyanine: Electrocatalytic Aspects for Oxygen Reduction," J. Phys. Chem. B, 108 (31) , 2004, p. 11375-11383.

Matter, Paul H., "Electrocatalytic and Fuel Processing Studies for Portable Fuel Cells," Dissertation, The Ohio State University, 2006, Section 3.3.4, pp. 73-74.

Wang, Eugenia, "Growth of Nitrogen-Containing Carbon Nanofibers," Honors Thesis, The Ohio State University, 2006, Section 1.4, pp. 11-13.

Maldonado, et al., "Influence of Nitrogen Doping on Oxygen Reduction Electrocatalysis at Carbon Nanofiber Electrodes,"J. Phys. Chem. B, 109, 2005, pp. 4707-4716.

* cited by examiner

CATALYSTS FOR USE IN ELECTROCHEMICAL APPLICATIONS AND ELECTRODES AND DEVICES USING SAME

CROSS REFERENCE TO RELATED CASES

This application claims priority to U.S. Provisional Patent Application Ser. No. 61/487,431 filed May 18, 2011, the disclosure of which is incorporated by reference herein in its entirety.

STATEMENT REGARDING FEDERALLY SPONSORED RESEARCH OR DEVELOPMENT

Embodiments of the invention disclosed in this application may have been developed with the use of research grant/contract funds under Basic Energy Sciences Contract No. GE-FG02-07ER15896, sponsored by the U.S. Department of Energy.

TECHNICAL FIELD

The present invention relates generally to catalysts, and more specifically to catalysts for use in electrochemical reactions.

BACKGROUND

The global demand for power continues to increase. Often, the combustion or burning of fossil fuels produces power to meet this demand. These processes are thermochemical in nature and often result in unburned fuel, particulates, and other noxious chemicals being injected into the atmosphere. For example, coal is burned to produce thermal energy to heat water. The resulting steam drives large turbines coupled to generators to thereby produce electricity. In the absence of downstream environmental controls, such as, scrubbers, coal burning power plants can introduce undesirable gases, residual pollutants, and particulates into the air. By way of additional example, an internal combustion engine in an automobile is configured to combust gasoline to drive a crankshaft that ultimately propels the automobile. Similarly, if not for downstream environmental controls, unburned fuel and incomplete combustion products often pollute the air. As the demand for power increases, the environmental impact of these methods of producing power is becoming more acute. For instance, it is now thought that waste gases from coal burning power plants are linked to global warming.

Driven by a desire to reduce direct environmental pollution, alternative sources of power are being investigated. One of the more promising sources of clean power is a fuel cell. Generally, a fuel cell produces electrical power from an electrochemical process, rather than a thermochemical process, and depending on the fuel used, may generate electrical power without the pollution associated with combustion or burning of fossil fuels.

One example of such a fuel cell is the Proton Exchange Membrane (PEM) fuel cell. A PEM fuel cell produces electrical power by an electrochemical process that includes a fuel, such as hydrogen gas, and an oxidant, such as oxygen gas. Hydrogen and oxygen are combined by an electrochemical process that produces electricity while emitting only water and heat to the environment. Thus, a PEM fuel cell utilizing hydrogen as a fuel and air (i.e., the source of oxygen) is essentially a zero emission system.

Fuel cells, such as the PEM fuel cell, are, however, not without their operational difficulties. For example, the Oxygen Reduction Reaction (ORR) at the cathode of a PEM fuel cell is often slow and is generally the largest source of inefficiency in a PEM fuel cell. Because oxygen in air is predominately diatomic ($O_2$), the molecule must be broken before oxygen can participate in the electrochemical reaction. The slow kinetics associated with the ORR are thought to be due to the oxygen-oxygen pi-bond being relatively strong and thus difficult to break. To address this difficulty, commercially viable PEM fuel cells include significant amounts of platinum in the cathode. The platinum significantly improves the ORR kinetics by facilitating breaking of the pi-bond in $O_2$. So, on the one hand, the presence of the platinum improves the otherwise slow kinetics for ORR and makes electrical power generation with PEM fuel cells a commercial possibility. On the other hand, however, inclusion of platinum increases the capital costs associated with PEM fuel cells and thus, from a cost perspective, inhibits large scale introduction of these devices.

Consequently, there is a need for cost-effective catalyst materials, electrodes, and for devices using those cost-effective catalyst materials.

SUMMARY OF INVENTION

To these and other ends, in one embodiment, an electrode for reduction of an oxidant comprises a phosphorus-doped carbon-containing catalyst represented by the chemical formula $CN_xP_y$, where x is from 0 to about 10 wt. % and y is from about 1 ppm to about 10 wt. %. The phosphorus-doped carbon-containing catalyst is capable of reducing the oxidant in an electrochemical reaction. In one embodiment, y is in the range of from about 1 ppm to about 6 wt. %. In another embodiment, y is in the range of from about 1 ppm to about 2 wt. %. In yet another embodiment, x is in the range of from about 1 ppm to about 10 wt. %.

In one embodiment, there is a device for producing electricity by facilitating an electrochemical reaction between a fuel and an oxidant. The device comprises a first electrode for oxidizing the fuel to produce protons and electrons. The electrons are capable of electrically powering or being used by an external circuit. The device further includes a second electrode in electrical communication with the first electrode when the device is electrically connected to the external circuit. The second electrode includes a phosphorus-doped carbon-containing catalyst for reducing the oxidant and is represented by the chemical formula $CN_xP_y$, where x is from 0 to about 10 wt. % and y is from about 1 ppm to about 10 wt. %. The device further includes an electrolyte, such as, a membrane, separating the first electrode from the second electrode. The electrolyte is configured to separate the fuel from the oxidant and to conduct the protons from the first electrode to the second electrode.

In one embodiment, the second electrode is free of other catalysts. In another embodiment, the second electrode does not contain a precious metal, such as platinum.

BRIEF DESCRIPTION OF THE DRAWINGS

The accompanying drawings, which are incorporated in and constitute a part of this specification, illustrate embodiments of the invention and together with the general description of the invention given above, and the detailed description given below, serve to explain various aspects of the invention.

DETAILED DESCRIPTION

Figure 1:
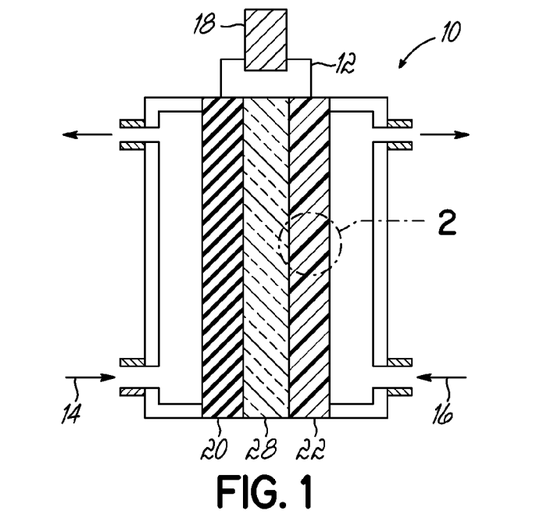
FIG. 1 is a schematic representation of a fuel cell in accordance with one embodiment of the invention.

With reference to FIG. 1, there is depicted an exemplary fuel cell 10 according to one embodiment of the invention. The fuel cell 10 may produce electrical power through an external circuit 12 from a flow of fuel represented by arrow 14 and a flow of oxidant represented by arrow 16. The external circuit 12 may include any one of a number of devices 18 or machines for performing some task. For example, where the fuel cell 10 is used in an automobile, the device 18 may include one or more motors that, when electrically powered, propel the automobile.

An electrochemical reaction generates a flow of electrons through the external circuit 12. To produce the electrons, the fuel cell 10 includes an electrode 20 which operates as an anode in the electrochemical reaction and includes an electrode 22 which operates as a cathode in the electrochemical reaction. Either one or both of the electrodes 20, 22 may contain a phosphorus-doped carbon-containing catalyst, as described in detail below, which is shown in FIG. 2 in the form of a layer 24.

With reference to FIG. 1, an electrolyte 28 is in direct contact with and separates the anode 20 from the cathode 22. In the representative fuel cell 10, the electrolyte 28 is a solid polymer electrolyte membrane. As such, the fuel cell 10 may be referred to as a Proton Exchange Membrane (PEM) fuel cell. The electrolyte 28 functions as an electrical insulator and separates the fuel 14 from the oxidant 16 while providing high ionic conductivity to protons and allowing the protons to travel from the anode 20 to the cathode 22. The fuel 14 may be hydrogen gas and the oxidant 16 may be oxygen in air or from another source. Other exemplary oxidants may include one or more of $CO_2$, $H_2O_2$, ozone, $N_2O$, $NO_2$, and iodine. However, it will be appreciated that embodiments of the present invention are not limited to a specific fuel and/or oxidant, as other fuels and/or oxidants may be used in accordance with the principles disclosed herein.

By this exemplary arrangement, the flow of the fuel 14 across the anode 20 produces positively charged protons and electrons. The protons pass through the electrolyte 28 to the cathode 22. In the embodiment shown in FIG. 1, the cathode 22 includes the phosphorus-doped carbon-containing catalyst. The electrons meanwhile travel through the external circuit 12 to the cathode 22. At the cathode 22, oxygen present in the oxidant 16 combines with the protons and the electrons. In this electrochemical reaction, oxygen is reduced by the electrons and combined with the protons to produce water and heat. Where the reactant gas is hydrogen and the oxidant is air containing oxygen, the ORR at the cathode 22 may be represented by the following equation: $O_2+4e^-+4H^+\rightarrow 2H_2O$. Thus, the fuel cell 10 emits only water and heat during operation. Advantageously, no environmental pollutants are produced.

Figure 2:
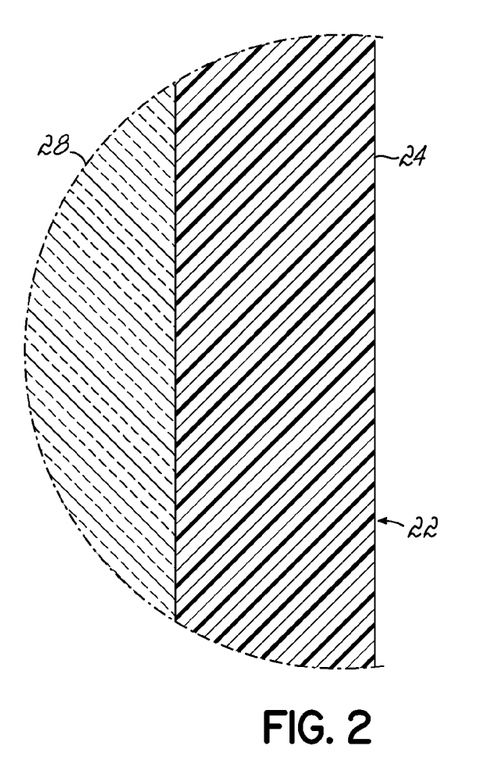
FIG. 2 is an enlarged view of the encircled area 2 of FIG. 1 in accordance with one embodiment of the invention.
Figure 3A:
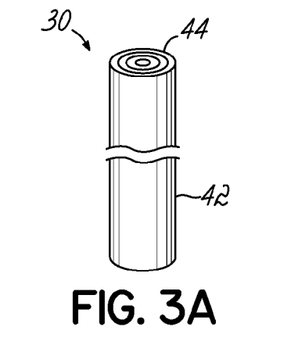
FIG. 3A is a schematic representation of a nanostructure according to one embodiment of the invention.
Figure 3B:
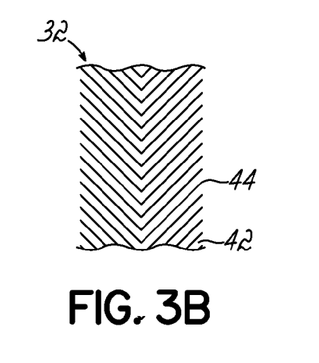
FIG. 3B is a schematic representation of a nanostructure according to another embodiment of the invention.
Figure 3C:
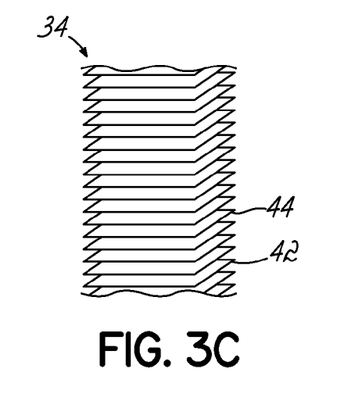
FIG. 3C is a schematic representation of a nanostructure according to another embodiment of the invention.
Figure 3D:
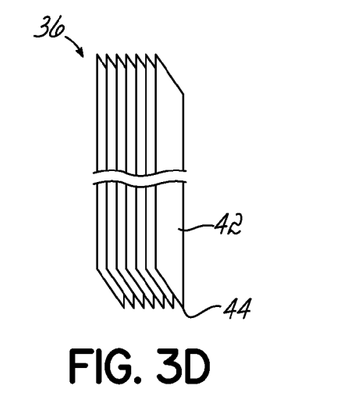
FIG. 3D is a schematic representation of a nanostructure according to another embodiment of the invention.
Figure 3E:
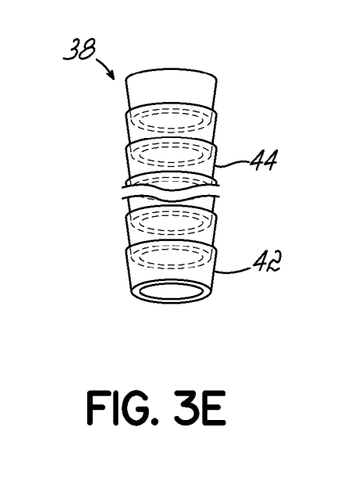
FIG. 3E is a schematic representation of a nanostructure according to another embodiment of the invention.
Figure 3F:
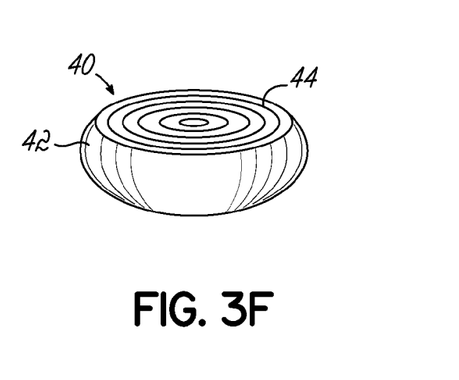
FIG. 3F is a schematic representation of a nanostructure according to another embodiment of the invention.

With reference to FIG. 2, the phosphorus-doped carbon-containing catalyst in the layer 24 may be represented by the chemical formula $CP_y$. In one embodiment, the phosphorus-doped carbon-containing catalyst is also doped with nitrogen so that the catalyst may be represented by the chemical formula $CN_xP_y$. The phosphorus-doped carbon-containing catalyst was found to exhibit unexpectedly improved activity and selectivity as compared to $CN_x$ (i.e., phosphorus-free catalysts) with only small amounts of phosphorus (P). It will be appreciated that the phosphorus may substitute for carbon in the crystal structure, though phosphorus may form functional groups that attach to carbon. However, embodiments of the present invention are not limited to the specific location(s) of the phosphorus in the catalyst.

It will be appreciated that while the figures and description set forth herein describe a representative embodiment as the fuel cell 10, embodiments of the present invention are not limited to fuel cells. For example, the phosphorus-doped carbon-containing catalyst may find use in air-cathode applications, metal-air batteries, industrial electrolysis (such as, electrolyzers for water or ammonia), other types of fuel cells (such as, direct alcohol fuel cells and phosphoric acid fuel cells), and sensors, to name only a few applications. More generally, catalysts according to embodiments of the present invention may be incorporated into other applications that require electro-catalytic reduction of an oxidant.

In one embodiment of the invention, and with continued reference to FIG. 2, the layer 24 may include a plurality of particles (not shown) of the phosphorus-doped carbon-containing catalyst in electrical contact with one another to form the layer 24. In this embodiment, the through-thickness of the layer 24 may therefore measure at least one particle in width. However, it will be appreciated that the layer 24 containing a plurality of phosphorus-doped carbon-containing catalyst particles do not need a support material. Thus, unlike platinum catalyst particles, which require a support material to form an electrode, electrodes of the phosphorus-doped carbon-containing catalyst as disclosed herein may be self-supporting.

Further in this regard, the layer 24 may also include particles of an additional material. The additional material may be another catalyst material, such as, platinum (Pt); an electrically conductive, non-catalyst material, such as, a support material; and/or a non-conducting polymeric material, such as, Nafion®. Thus, the layer 24 may be formed of a mixture of particles of the phosphorus-doped carbon-containing catalyst and particles of other materials. In one embodiment, the electrode 22 is free of precious metals, such as, Pt. Exemplary materials that may be mixed with the particles of the phosphorus-doped carbon-containing catalyst may include carbides, nitrides, sulfides, oxides, and/or borides. In embodiments with a mixture of the phosphorus-doped carbon-containing catalyst and another material, the relative percentage of the particles of the catalyst may vary depending on the application for the electrode.

Alternatively, the layer 24 may include particles of the phosphorus-doped carbon-containing catalyst dispersed or distributed within a support material (not shown). The support material may be an electrically conducting, relatively chemically inert material, such as, a carbon-based support with or without any doping and with a high surface area.

In embodiments in which the layer 24 includes particles of the phosphorus-doped carbon-containing catalyst, the configuration of the particles may be irregular. However, other configurations, such as, spherical, acicular, or flake like, among others, are possible. It will be appreciated that configuration of the particles will depend on the method by which they are made, as is set forth in more detail below.

To make the electrode 22, the electrolyte 28 may be coated with an ink that contains a suspension of particles of the phosphorus-doped carbon-containing catalyst in an aqueous and/or organic containing solution. The ink may further include surface active agents, polytetrafluoroethylene (PTFE) and/or Nafion® (a sulfonated tetrafluoroethylene-based fluoropolymer-copolymer produced by DuPont). This may be referred to as a "catalyst coated membrane." The catalyst coated membranes may be prepared by spraying, rolling, or printing the catalyst-containing ink on to the electrolyte 28. Another alternative technique is to coat a gas diffusion layer with the ink. A gas diffusion layer is a porous material that allows diffusion of reactant gases. The gas diffusion layer may include a carbon material, such as, carbon cloth, carbon paper, or naturally occurring carbon fibers; PTFE; and/or Nafion®. The ink coated gas diffusion layers may then be sandwiched with the electrolyte 28 in between and then the sandwich is pressed together, with or without heat. An alternative method is referred to as a "decal method" in which the ink is applied to a substrate (not shown), for example, a polymer film, and then the coated substrate is then pressed against the electrolyte 28. The substrate is removed leaving the "decal" of the catalyst layer on the electrolyte 28. These techniques may also be referred to as Membrane Electrode Assembly (MEA).

In one embodiment, the phosphorus-doped carbon-containing catalyst is represented by the chemical formula $CP_y$ and/or $CN_xP_y$ in which y is less than about 10 wt. % though a minimal amount of phosphorus is present. As is set forth in more detail below, the phosphorus-doped carbon-containing catalyst may be synthesized and/or grown from a phosphorus-containing fluid or a phosphorus-containing support material. The catalyst may therefore incorporate at least a minimal amount phosphorus from the synthesis process. The minimum amount of phosphorus may be an amount that is at or below the limit of detection for X-ray Photoelectron Spectroscopy (XPS). In one embodiment, phosphorus is present in at least about 1 part per million (ppm). By way of example, y may be in the range of from about 1 ppm to about 6 wt. %, and by way of further example, y may be in the range of from about 1 ppm to about 2 wt. %. When present, the amount of nitrogen represented by "x" in $CN_xP_y$ may range from about 1 ppm to about 10 wt. % and, by way of further example, nitrogen may range from about 1 wt. % to about 10 wt. %. In one embodiment, the phosphorus-doped carbon-containing catalyst does not include any intentionally added dopants or additions, other than P and N. However, the phosphorus-doped carbon-containing catalyst may include other elements, such as, oxygen and/or sulfur, introduced by exposing the catalyst to the ambient atmosphere or introduced from raw materials during processing and/or may include metals, such as, iron (Fe) or cobalt (Co), which may be encapsulated by carbon. Because the nanostructures synthesized by the processes described herein are primarily carbon graphite, they are generally electrically conductive.

In general, the phosphorus-doped carbon-containing catalyst may be obtained by addition of phosphorus to a process while growing a carbon-based nanostructure (shown, for example, in FIGS. 3A-3F) whereby the phosphorus may be incorporated into the crystal structure as the nanostructure grows. However, the phosphorus-doped carbon-containing catalyst as disclosed herein is not limited to that produced by any particular process, as there are other known methods of doping or incorporating phosphorus into a carbon-based crystal structure. For example, one such process may include Atomic Layer Deposition (ALD). ALD may be used to prepare the phosphorus-doped carbon-containing catalyst described herein. Further, it will be appreciated that ALD may be used to prepare the catalyst at lower temperatures than those temperatures disclosed below.

To that end, and in an exemplary process, the phosphorus-doped carbon-containing catalyst may be prepared by initially preparing a seed material that facilitates subsequent catalyst synthesis and/or growth. The seed material may include a transition metal, for instance, iron (Fe), supported on a substrate (not shown). Other suitable transition metals or transition metal alloys may include any of those found in Groups 3-12 of the Periodic Table of Elements and, by way of specific example, the transition metal may include cobalt (Co), nickel (Ni), manganese (Mn), or an iron-copper alloy.

The substrate may be any material that can be later removed or separated from the nanostructure. In this regard, the substrate is not intended to be included in the catalyst though minor amounts of the substrate may find its way into the catalyst. By way of example only, the substrate may be a metal oxide, for instance, magnesia (MgO), alumina ($Al_2O_3$), or silica ($SiO_2$), or a carbide, a nitride, or a boride. Powders of these materials may be purchased from commercial sources, such as, Sigma Aldrich and Alfa Aesar. However, other suitable substrates may include carbon materials, including, for example, carbon black available from Cabot Corporation under the trademark Vulcan® XC-72 or Black Pearls® 2000, or carbon black available from AkzoNobel Polymer Chemicals as Ketjen Black. The substrate may be in particulate form with a surface area of from about 30 $m^2$/g to about 1,500 $m^2$/g. For example, MgO powder may have a surface area of about 150 $m^2$/g and Black Pearls® 2000 carbon black may have a surface area of about 1,380 $m^2$/g.

The seed material may be prepared by impregnating the substrate, such as the particles described above, with between about 0.01 to about 10 wt. % of the transition metal and, by way of additional example, between about 1 wt. % and about 3 wt. %. Impregnating the substrate may be achieved by wet impregnation as is known in the art though other impregnation techniques may be suitable. Suitable mole ratios of phosphorus to the transition metal in the mixture may range from about 0.01 to about 100, and by way of further example, mole ratios of phosphorus to the transition metal in the mixture may range from about 0.1 to about 20. In one embodiment, the seed material may be dispersed in a phosphorus-containing material, such as, tri-phenylphosphine (TPP) with chemical formula $P(C_6H_5)_3$. Where the transition metal is Fe, the P/Fe ratio in the TPP to Fe mixture is equal to or less than about 20. In another embodiment, the ratio of phosphorus to the transition metal in the phosphorus-doped carbon-containing catalyst is about 3 or less. Again, where the transition metal is Fe and the phosphorus-containing material is TPP, the P/Fe ratio may be about 3 or less.

This seed material mixture may be heated to elevated temperatures in a non-oxidizing gas, for instance, nitrogen gas. Exposing the heated mixture to a carbon-containing or carbon-and-nitrogen containing feed gas causes the nanostructures (e.g., nano-fibers) to form and/or grow while incorporating phosphorus from the phosphorus-containing material. Exemplary carbon-and-nitrogen containing feed gases may include acetonitrile ($CH_3CN$) vapors, acetonitrile vapors spiked with ammonia ($NH_3$) at up to 1:1 mole ratios of C:N in the feed gas, or another source of carbon (for example, carbon monoxide), nitrogen, and/or phosphorus that pyrolyzes at elevated temperatures in the presence of the seed material. Other gases may also be added to the feed gas to facilitate growth including, for example, thiophene ($C_4H_4S$) or $H_2S$. Alternatively, it will be appreciated that phosphorus may be incorporated or doped into the catalyst by exposing the seed material to a carbon and phosphorus-containing material, such as TPP vapors or $PH_3$ rather than dispersing the seed material in TPP, as set forth above. Thus, exposing the heated mixture of the seed material may include exposing a transition-metal doped feed material to a vapor of TPP and a carbon-and-nitrogen containing feed gases.

Nanostructure growth of $CN_xP_y$ may occur on the transition metal impregnated seed material at elevated temperatures in the range of about 500° C. to about 1,200° C., and by way of specific example, at about 900° C. When grown at above atmospheric pressures, lower temperatures, for example, lower than 500° C., may be used. It will be appreciated that $CP_y$ catalysts may be made in a similar manner though pyrolysis occurs in the absence of the acetonitrile vapor or other nitrogen-containing vapor. It is also possible to prepare the phosphorus-doped carbon-containing catalyst using seed materials without a substrate. These materials may include alloys or mixed oxides of iron (Fe) and mixed oxides of copper (Cu), nickel (Ni), or cobalt (Co).

Following growth of the nanostructure, the seed material may be removed. For example, where the seed material is an iron-impregnated metal oxide substrate, it may be separated from the nanostructure by acid washing or base treatment. It will be appreciated, however, there may be residual transition metal left in the nanostructure after the bulk of the seed material is removed. In other words, the phosphorus-doped carbon-containing catalyst may include residual amounts of transition metal and/or substrate from the growth process. The residual amount of transition metal may amount to a trace amount (i.e., tens of ppm) to no more than about 3 wt. % of the nanostructure. However, the residual transition metal is generally inaccessible to reactants in the fuel cell, because the residual metal is surrounded or encased by the phosphorus-doped carbon-containing catalyst. While residual transition metal is not generally thought to be a source of catalytic activity, there may be some contribution to activity from the residual transition metal.

In one embodiment, the phosphorus-doped carbon-containing catalyst consists essentially of $CP_y$ and/or $CN_xP_y$. As used herein, "consisting essentially of" means that no other elements are intentionally added to the $CP_y$ catalyst and/or the $CN_xP_y$ catalyst. However, impurity content of other elements from the raw materials in the growth process may be contemplated. These elements may include oxygen and sulfur, as set forth herein. Further, residual seed material or other nanostructure growth-facilitating material in the $CP_y$ catalyst and/or the $CN_xP_y$ catalyst may also be contemplated.

In addition or alternatively, other post-treatments may include mechanically milling the nanostructure to increase the surface area thereof. Advantageously, this also may increase the activity of the resulting catalyst. Milling may include ball milling the nanostructures although there are other suitable milling processes that may be sufficient to fracture the nanostructures.

Additionally, the nanostructures may be treated with ammonia, with another nitrogen-containing precursor, and/or in a phosphorus-containing material, for example, in a vapor containing TPP. Other treatments may include treatment with sulfur-containing compounds, for example, thiophene or $H_2S$. Such treatments may be performed at elevated temperatures of between about 500° C. and about 1,100° C. to further functionalize the surface of the nanostructures. By way of example, additional treatments may include an acid treatment whereby the nanostructures are exposed to an acid, such as HCl. Further, the acid treatment may include heating the nanostructure to about 60° C. before exposing it to the acid.

As set forth above, and as shown in FIG. 2, the phosphorus-doped carbon-containing nanostructure may be a particle from the growth process or from any subsequent processing of the nanostructure, such as by milling nano-fiber. While embodiments of the present invention are described with reference to nano-fibers, the nanostructure may have a configuration other than that of a nano-fiber. With reference to FIGS. 3A-3F, other exemplary nanostructures include multi-walled nanotubes 30, herringbone structures 32, stacked platelets 34, ribbons 36, stacked cups 38 (also referred to as bamboo structures), and onion-like nanostructures 40 (shown with a portion cutaway to illustrate a layered graphite structure), respectively. Each of these nanostructures includes basal planes 42 and edge planes 44. Without being limited to any specific structure shown in FIGS. 3A-3F, it is thought that the herringbone structures 32 (FIG. 3B) and stacked cups 38 (FIG. 3E) may exhibit the highest activity of the nanostructures shown. In this regard, it is believed that the greater number of exposed edge planes 44 or defects is related to a greater activity of the catalyst. Additionally, the nanostructure may have a dimension in at least one direction in the range of about 5 nm to about 50 nm. By way of example and not limitation, a nano-fiber may have a radius in this range though the length of the fiber may be much larger, possibly 100 nm or more. The nanostructure may be characterized by a high surface area, that is, from about 10 $m^2/g$ to about 3,000 $m^2/g$, and have good electrical conductivity. While embodiments as disclosed herein refer to crystal structures, the nanostructures may be amorphous.

In another exemplary process, the phosphorus-doped carbon-containing catalyst may be continuously grown. In this embodiment, a volatile transition metal compound may be injected into a nitrogen carrier gas and then that mixture may be fed into a vertically mounted reactor tube (not shown) held at an elevated temperature, for example, in the range of about 500° C. to about 1,100° C. The volatile transition metal compound may include a metal carbonyl, for instance, iron carbonyl, that facilitates or catalyzes the nanostructure growth process. Other volatile transition metal compounds may include any transition metal of Groups 3-12 of the Periodic Table of Elements. By way of specific example, the volatile transition metal compound may include cobalt- and nickel-containing compounds. The volatile transition metal compound may form nanoparticles that catalyze the growth of the phosphorus-doped carbon-containing nanostructures (e.g., nano-fibers).

Also injected into the reactor are other vapor phase precursors, the composition of which may be determined by the desired composition of the phosphorus-doped carbon-containing catalyst. In the reactor, nanostructures of the phosphorus-doped carbon-containing catalyst may grow and then are collected in a solids trap below the vertically mounted reactor tube. The nanostructure collected may be purified by washing with acid and then subjected to additional post treatments as described above to form the catalyst.

Specifically, in one embodiment, where it is desired to produce a $CN_xP_y$ catalyst, the vapor phase precursors may include a carbon-containing precursor, a carbon-and-nitrogen-containing precursor, and a phosphorus-containing precursor. By way of example, a nitrogen carrier may be humidified with vapors of acetonitrile and then spiked with ammonia to form the carbon-and-nitrogen-containing precursor, and the phosphorus-containing precursor may be nitrogen humidified with TPP. In this regard, the TPP can be fed into the reactor tube by heating it above its melting point. The vapors therefrom may then be injected into the reactor with nitrogen carrier gas. As set forth above, the C:N mole ratio in the vapor phase precursor may be up to about 1:1. The injection of the vapor phase precursors and the volatile transition metal compound may be substantially simultaneous to obtain growth of the nanostructure.

In yet another exemplary process, a continuous fluidized bed may be utilized to grow in the phosphorus-doped carbon-containing nanostructure. In one embodiment, the carbon-containing precursor, phosphorus-containing precursor, and nitrogen-containing precursor disclosed above may be injected into a fluidized bed reactor (not shown) containing particles of a metal catalyst. The fluidized bed reactor may be held at elevated temperatures, such as, in the range of from about 500° C. to about 1,200° C. Similar to those processes set forth above, the metal catalyst facilitates the formation of the phosphorus-doped carbon-containing nanostructure, for example, nano-fibers of $CN_xP_y$. By the exemplary process, the nanostructures and the metal catalyst particles may become entrained in the gas stream and may then be collected from an exhaust port of the fluidized bed reactor. Similar to the process above, the nanostructures of the phosphorus-doped carbon-containing catalyst may be purified by treatment with acid and may then be subjected to additional post treatments described above.

In order to facilitate a more complete understanding of the invention, the following non-limiting examples are provided.

Figure 4:
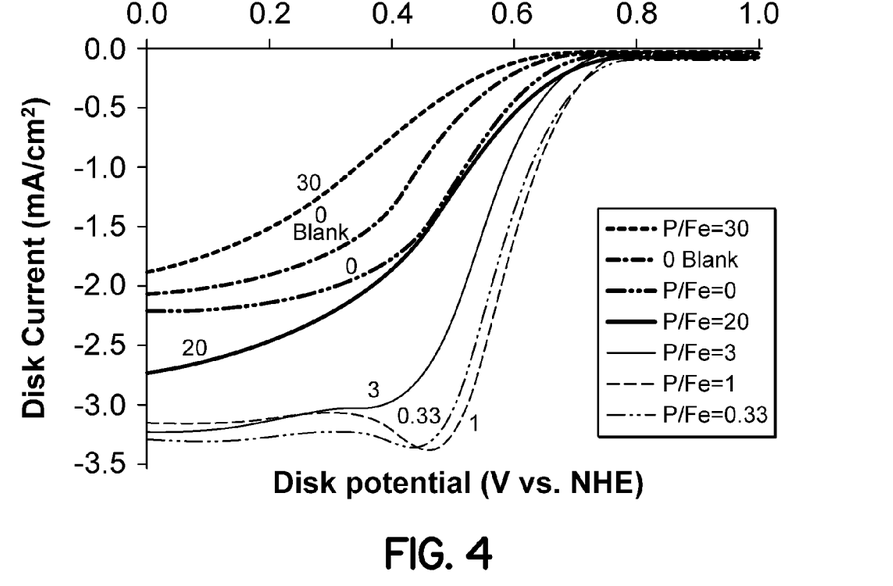
FIG. 4 is a graph of "Disk Potential" versus "Disk Current" for $CN_xP_y$ and $CN_x$ catalysts.
Figure 5:
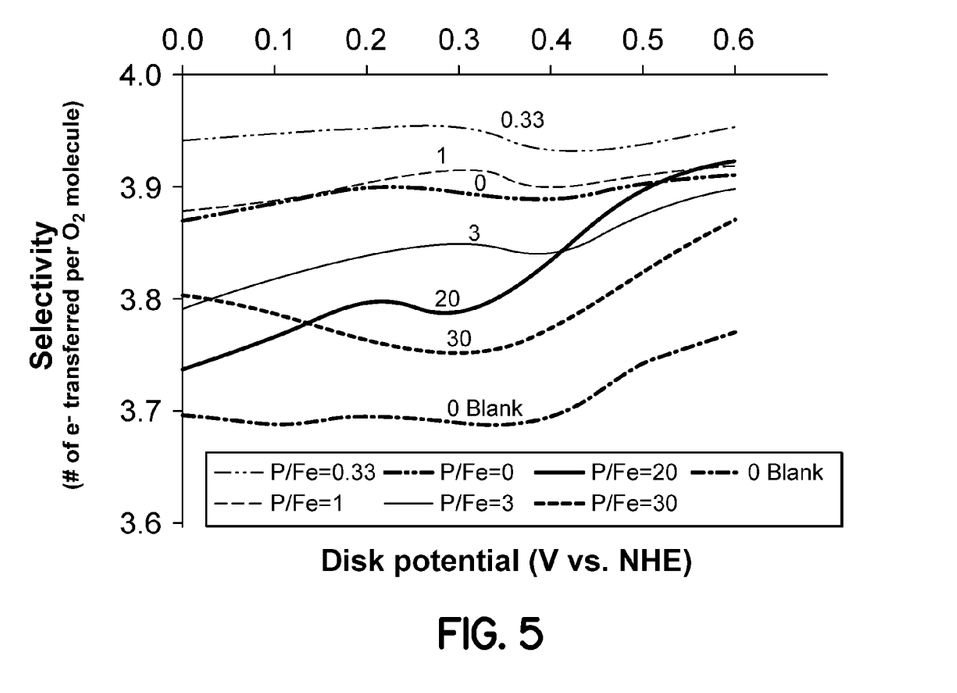
FIG. 5 is a graph of "Disk Potential" versus "Selectivity" for the $CN_xP_y$ and $CN_x$ catalysts of FIG. 4.

EXAMPLES $CN_xP_y$ catalysts and $CN_x$ catalysts were synthesized by pyrolyzing acetonitrile over growth medium of a seed material of MgO impregnated with 2 wt. % Fe via incipient-wetness-impregnation (IWI). Each of the growth mediums for the $CN_xP_y$ and $CN_x$ were different. For the $CN_xP_y$ catalysts, the Fe—MgO seed material was subject to an additional IWI step with tri-phenylphosphine (TPP) and diethyl ether at predetermined ratios of P to Fe as indicated in FIGS. 4 and 5. As shown, the $CN_xP_y$ catalysts were grown with P/Fe ratios of 0.33, 1, 3, 20, and 30. This additional treatment was conducted prior to pyrolyzing acetonitrile over the seed material.

To isolate the effect of the additional IWI step with TPP, a second impregnation of diethyl ether without TPP was prepared (labeled "P/Fe=blank" or phosphorus free) from which a $CN_x$ catalyst was grown. The resulting $CN_x$ (P/Fe=0 blank) catalyst was also measured for comparison and is shown in FIGS. 4 and 5. In addition, another $CN_x$ catalyst (P/Fe=0) was grown from a growth medium that was produced without the second impregnation of diethyl ether. This $CN_x$ catalyst is labeled "P/Fe=0" in FIGS. 4 and 5.

The respective growth medium/mixture was then heated in a reactor in nitrogen gas to about 900° C. Acetonitrile was injected into the reactor to grow either the $CN_xP_y$ catalysts or the $CN_x$ catalysts in the respective mediums set forth above. After about two hours, the respective catalyst was removed from the reactor and was treated in 1M HCl for about 1 hr. at 60° C. to remove any exposed MgO and Fe. The acid treated catalyst was then rinsed with deionized water.

ORR performance was determined for each catalyst by using cyclic voltammograms (CVs) and in oxygen-saturated half-cell of 0.5 M $H_2SO_4$ electrolyte with a Ag/AgCl reference electrode on a rotating ring disk electrode (RRDE). The disk was glassy carbon with a surface area of 0.19625 $cm^2$. The ring collection efficiency was 37%. The RRDE measurements were taken at 1,000 rpm and 10 mV/s at room temperature.

To prepare for the RRDE measurements, ink compositions for the $CN_x$ catalyst and each of the $CN_xP_y$ catalysts were prepared. Each catalyst-containing ink was prepared by mixing a ratio of 1:10:60 of catalyst to 5% Nafion® in aliphatic alcohol to 100% ethanol by weight. Each catalyst-containing ink was immediately sonicated and 426 µg/$cm^2$ of the catalyst was applied to the glassy carbon disk electrode of the RRDE.

RRDE measurements, shown in FIG. 4, depict "Disk Potential" versus "Disk Current" for each $CN_xP_y$ catalyst (i.e., P/Fe ratios of 0.33, 1, 3, 20, and 30) compared to two phosphorus-free $CN_x$ catalysts (labeled "P/Fe=0" and "0 blank").

In addition to RRDE measurements, ORR selectivity was determined by measuring the hydrogen peroxide produced during the RRDE measurements set out above. Selectivity of the catalysts is shown in FIG. 5. It is known that hydrogen peroxide formation is undesired because it can corrode components, and its formation only consumes two electrons and two protons per oxygen molecule. Thus, higher selectivity, that is, higher consumption of electrons is desirable. The Disk Potential versus Selectivity is plotted in FIG. 5. Based on these measurements, the P/Fe=0.33 composition was selected for comparison to a Pt/VC composition.

Figure 6:
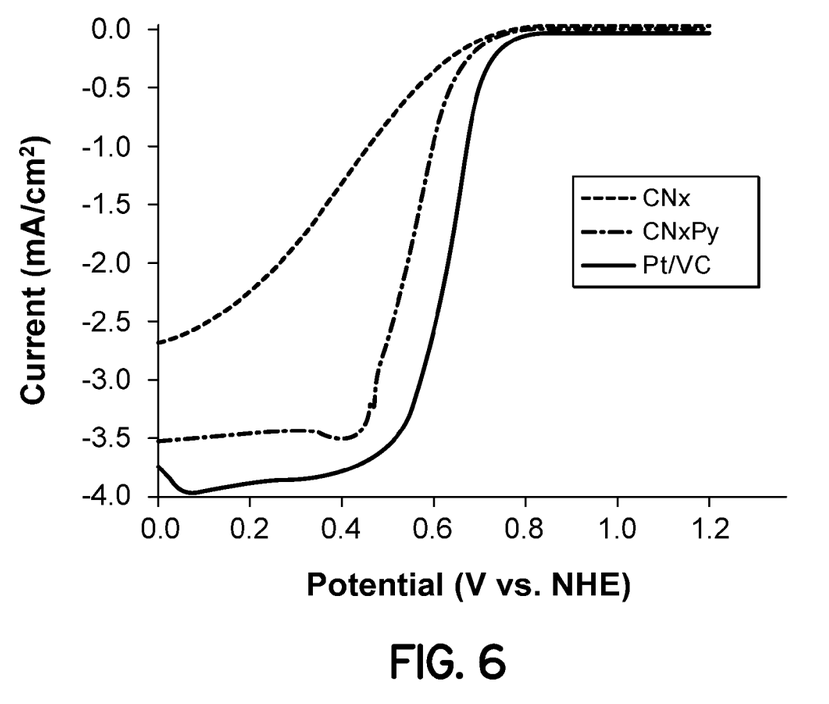
FIG. 6 is a graph of "Disk Potential" versus "Disk Current" for a selected $CN_xP_y$ (i.e., P/Fe=0.33) catalyst and $CN_x$ catalyst as compared to a Pt catalyst (Pt/VC).

Referring now to FIG. 6, a platinum (Pt) catalyst in Vulcan® Carbon from Cabot Corporation (labeled "Pt/VC") was prepared for comparison to the $CN_x$ and $CN_xP_y$ catalyst set out above. The Pt-VC ink composition was prepared by mixing 5 mg of platinum in 1000 µL of ethanol and 50 µL Nafion®. The Pt-VC proportions were 20 wt. % Pt and 80 wt. % VC. The Pt-VC ink was applied to the disk by application of 6 µL of the ink to obtain a catalyst loading of 145 µg of Pt-VC per $cm^2$ (about 29 micrograms of Pt per $cm^2$).

Each of the non-platinum catalysts shown in FIG. 6, i.e. a $CN_x$ catalyst (P/Fe=0) and a $CN_xP_y$ catalyst (P/Fe=0.33), where prepared with ink compositions that included 10 mg of the respective catalyst mixed in 250 µL of ethanol and 95 µL of Nafion®. Each of these compositions was then applied to a clean glassy carbon disk by applying 9 µL of the ink composition to the disk. The respective catalyst loading on the disk was approximately 800 µg per $cm^2$.

Similar to that shown in FIG. 4, ORR performance shown in FIG. 6 was determined for each catalyst by using cyclic voltammograms (CVs) and in oxygen-saturated half-cell of 0.5 M $H_2SO_4$ electrolyte with a Ag/AgCl reference electrode on a rotating ring disk electrode (RRDE). The disk was glassy carbon with a surface area of 0.2472 $cm^2$. The ring collection efficiency was 37%. The RRDE measurements were taken at 1,000 rpm and 10 mV/s at room temperature.

As shown in FIG. 6, the selected $CN_xP_y$ catalyst (P/Fe=0.33) had nearly the same current response in ORR measurement as the Pt catalyst (Pt/VC) and was a substantially more favorable response than the $CN_x$ catalyst (P/Fe=0).

Although not shown, selectivity of each of the above-identified catalysts was also measured. The selectivities were taken at potential values of 0.5-0.6V versus Normal Hydrogen Electrode (NHE). The selectivity of the Pt/VC sample was about 3.9, the selectivity of the $CN_x$ catalyst (P/Fe=0) was about 3.7, and the selectivity of the $CN_xP_y$ catalyst (P/Fe=0.33) was also about 3.7.

While the present invention has been illustrated by description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. An electrode for reduction of an oxidant, the electrode coating an electrolyte and comprising:
a layer including a plurality of particles of a phosphorus-doped carbon-containing catalyst having a nanostructure of at least one of a herringbone structure, a stacked platelet, a ribbon, a stacked cup, or a graphene sheet, the layer being a self-supporting layer of the particles on the electrolyte or the layer including additional particles of a different catalyst material and/or particles of a non-catalyst material on the electrolyte, the phosphorus-doped carbon-containing catalyst represented by the chemical formula $CN_xP_y$, where x is a number that represents the amount of nitrogen, which is present in an amount from about 1 ppm to about 10 wt. %, and y is a number that represents the amount phosphorous phosphorus, which is present in an amount from about 1 ppm to about 10 wt. %, the phosphorus-doped carbon-containing catalyst being configured to reduce the oxidant in an electrochemical reaction.

2. The electrode of claim 1 wherein phosphorus is present in an amount in the range of from about 1 ppm to about 6 wt. %.

3. The electrode of claim 1 wherein phosphorus is present in an amount in the range of from about 1 ppm to about 2 wt. %.

4. The electrode of claim 1 wherein the phosphorus-doped carbon-containing catalyst does not include other dopants.

5. The electrode of claim 1 wherein the electrode does not contain a precious metal.

6. The electrode of claim 1 wherein the phosphorus-doped carbon-containing catalyst includes at least about 1 ppm of a transition metal to not more than 3 wt. % of the transition metal.

7. A device for producing electricity by facilitating an electrochemical reaction between a fuel and an oxidant, the device comprising:
a first electrode for oxidizing the fuel to produce protons and electrons, the electrons available for use in an external circuit;
a second electrode in electrical communication with the first electrode when electrically connected to the external circuit, the second electrode including a plurality of particles in a layer and including a phosphorus-doped carbon-containing catalyst for reducing the oxidant and being represented by the chemical formula $CN_xP_y$, where x is a number that represents the amount of nitrogen, which is present in an amount from about 1 ppm to about 10 wt. %, and y is a number that represents the amount of phosphorus, which is present in an amount from about 1 ppm to about 10 wt. %, the catalyst having a nanostructure of at least one of a herringbone structure, a stacked platelet, a ribbon, a stacked cup, or a graphene sheet; and
an electrolyte separating the first electrode from the second electrode and being configured to separate the fuel from the oxidant and to conduct the protons from the first electrode to the second electrode, the layer being a self-supporting layer of the particles on the electrolyte or the layer including additional particles of a different catalyst material and/or particles of a non-catalyst material on the electrolyte.

8. The device of claim 7 wherein phosphorus is present in an amount in the range of from about 1 ppm to about 6 wt. %.

9. The device of claim 7 wherein phosphorus is present in an amount in the range of from about 1 ppm to about 2 wt. %.

10. The device of claim 7 wherein the phosphorus-doped carbon-containing catalyst does not include other dopants.

11. The device of claim 7 wherein the second electrode does not contain a precious metal.

12. An electrode for reduction of an oxidant, the electrode coating an electrolyte and comprising:
a layer of a plurality of particles of a phosphorus-doped carbon-containing catalyst having a nanostructure of at least one of a herringbone structure, a stacked platelet, a ribbon, a stacked cup, or a graphene sheet, the layer being a self-supporting layer of the particles on the electrolyte or the layer including additional particles of a different catalyst material and/or particles of a non-catalyst material on the electrolyte, the phosphorus-doped carbon-containing catalyst consisting essentially of carbon, nitrogen, and phosphorus and being represented by the chemical formula $CN_xP_y$, where x is a number that represents the amount of nitrogen, which is present in an amount from about 1 ppm to about 10 wt. %, and y is a number that represents the amount of phosphorus, which is present in an amount from about 1 ppm to about 10 wt. %, the phosphorus-doped carbon-containing catalyst being configured to reduce the oxidant in an electrochemical reaction.

* * * * *